United States Patent [19]

Takeuchi

[11] Patent Number: 4,781,946
[45] Date of Patent: Nov. 1, 1988

[54] VEHICLE POLISHING METHOD AND APPARATUS

[75] Inventor: Shigeo Takeuchi, Nagoya, Japan

[73] Assignee: Takeuchi Tekko Kabushiki Kaisha, Aichi, Japan

[21] Appl. No.: 144,136

[22] Filed: Jan. 15, 1988

[30] Foreign Application Priority Data

Apr. 25, 1987 [JP] Japan ................................ 62-104477

[51] Int. Cl.[4] .......................... B05D 3/00; B05D 3/12
[52] U.S. Cl. ................................. 427/327; 427/333; 427/416; 118/72; 106/3
[58] Field of Search ................... 118/72; 427/327, 333, 427/337, 416; 106/3

[56] References Cited

U.S. PATENT DOCUMENTS

4,522,245  11/1986  Takeuchi ............................. 427/327

Primary Examiner—Sam Silverberg
Attorney, Agent, or Firm—Armstrong, Nikaido, Marmelstein & Kubovcik

[57] ABSTRACT

A vehicle polishing method includes a first polishing step of moving a portal or gate-type travel frame travellable forwardly and backwardly in one of opposite travelling direction over a stationary vehicle to polish the body surface of the vehicle by rotary brush means mounted on the travel frame during such movement while applying a foamy primary treating agent containing an anionic surfactant onto the body surface by a primary treating agent applicator mounted on the travel frame, and a second polishing and rinsing step of moving the travel frame in the other travelling direction and polishing the body surface by the rotary brush means while applying an aqueous wax containing a cationic surfactant onto the body surface by an aqueous wax applicator, and ejecting fresh water onto the body surface by a rinsing unit mounted on the travel frame to wash away the excessive wax from the body surface. After termination of the first polishing step and before starting of the second polishing and rinsing step, the cationic surfactant-containing aqueous wax is applied to the rotary brush means for a predetermined period of time. The apparatus for carrying out such polishing method specifically includes an aqueous wax applicator which has nozzle means adapted to directly eject an aqueous way toward the rotary brush means.

2 Claims, 5 Drawing Sheets

VEHICLE POLISHING METHOD AND APPARATUS

BACKGROUND OF THE INVENTION

1. Field of the Invention

The present invention relates to a method for polishing bodies of vehicles, particularly of automobiles, and an apparatus for carrying out the method.

2. Description of the Prior Art

A vehicle polishing method which is conventionally known, for example, from U.S. Pat. No. 4,622,246, comprises a first polishing step of forwardly or backwardly moving a portal or gate-type travel frame travellable forwardly and backwardly over a stationary vehicle to polish the body surface of the vehicle by a rotary brush or brushes mounted on the travel frame during such movement while applying a primary treating agent containing an anionic surfactant in the foamy form onto the body surface of the vehicle by a primary treating agent applicator mounted on the travel frame, and a second polishing and rinsing step, following the first polishing step, of backwardly or forwardly moving the travel frame and repolishing the body surface by the rotary brush or brushes during such movement while applying an aqueous wax containing a cationic surfactant onto the body surface by an aqueous wax applicator, and then ejecting fresh water onto the body surface from a rinsing unit mounted on the travel frame to wash away the excessive wax from the body surface.

With the above prior art method, when the cationic surfactant-containing aqueous wax applied at the second polishing step is deposited on the anionic surfactant-containing primary treating agent rubbed on the body surface at the first polishing step, both of the surfactants react together to convert a wax component dissolved in the aqueous wax into an insoluble wax component which is rubbed onto the body surface under the polishing action of the rotary brushes to form a wax film. However, there is a slight time lag from the point of contact of both the surfactants to the point when a satisfactory amount of the insoluble wax component is produced. Meanwhile, an average of travel speeds of the portal travel frame has been recently increased as high as 9 to 10 m/min. (formerly 4 to 5 m/min.) in order to provide a reduction in working time, and there is also a tendency of the polishing time for the body surface to be shortened. Particularly, for the body surface (e.g., the front surface of a bonnet indicated by a character B in FIG. 6b) which is to be polished by the rotary brushes at the beginning of the second polishing step, i.e., at the beginning of contact of the primary treating agent with the aqueous wax, the polishing can be completed when a satisfactory amount of the insoluble wax component is still not produced, resulting in a failure to satisfactorily rub the insoluble wax component onto such surface portion. This leads to a problem that a wax effect on such surface portion is inferior to that on the other surface portion of the vehicle body.

SUMMARY OF THE INVENTION

It is therefore an object of the present invention to provide a vehicle polishing method and apparatus wherein the above problem will not arise even if a portal or gatetype travel frame is of a high speed type.

According to the present invention, the above object is accomplished by providing a vehicle polishing method comprising at least: a first polishing step of moving a portal travel frame travellable forwardly and backwardly in one of opposite travelling directions over a vehicle held in a stationary state to polish the body surface of the vehicle by rotary brush means mounted on the travel frame during such movement while applying a primary treating agent containing an anionic surfactant in a foamy form onto the body surface of the vehicle by a primary treating agent applicator mounted on the travel frame; and a second polishing and rinsing step of moving the travel frame in the other travelling direction and polishing the body surface by the rotary brush means while applying an aqueous wax containing a cationic surfactant onto the body surface by an aqueous wax applicator, and further ejecting fresh water onto the body surface by a rinsing unit mounted on the travel frame to wash away excessive wax from the body surface, wherein after termination of the first polishing step and before starting of the second polishing and rinsing step, the cationic surfactant-containing aqueous wax is applied to the rotary brush means for a predetermined period of time.

In addition, according to the present invention, there is provided a vehicle polishing apparatus on a portal travel frame reciprocally travellable on travel rails over a vehicle, the apparatus comprising rotary brush means which is commonly usable for both brushing and washing operation and polishing operation of a body surface of the vehicle, a cleaner applicator for applying a cleaner onto the body surface, a primary treating agent applicator for applying a foamy primary treating agent containing an anionic surfactant onto the body surface, an aqueous wax applicator for applying an aqueous wax containing a cationic surfactant onto the body surface, a rinsing unit for ejecting fresh water onto the body surface, and a dryer for drying the body surface, wherein the aqueous wax applicator includes nozzle means adapted to directly eject the aqueous wax toward the rotary brush means.

With the above method, the aqueous wax containing the cationic surfactant is directly applied to the rotary brush means prior to the second polishing step and hence, the applied aqueous wax can react with the anionic surfactant-containing primary treating agent deposited on the rotary brush means at the previous step, i.e., at the first polishing step to satisfactorily produce and retain an insoluble wax component within the rotary brush means. Therefore, from the beginning of the second polishing step, the insoluble wax component can be satisfactorily rubbed onto a body surface which is to be polished by the rotary brush means at the beginning of the second polishing step, thereby giving a thick wax film thereon.

In addition, with the above polishing apparatus according to the present invention, not only the first polishing step and the second polishing and rinsing step can be sequentially carried out without any hindrance, but also the cleaner applicator and the rotary brush means can be operated prior to the first polishing step to brush and wash the body surface, and after the second polishing and rinsing step, the dryer can be operated to dry the body surface. Accordingly, it is possible to further enhance a polishing effect on the body surface. Further, since the aqueous wax applicator for applying the aqueous wax onto the body surface at the second polishing step is also used as means for directly applying the aqueous wax to the rotary brush means prior to the second polishing step, and since the rotary brush means is used in both the brushing-washing and the polishing operations, the polishing apparatus can be simplified as a whole, leading to a cost reduction.

The above and other objects, features and advantages of the present invention will become apparent from the following description of preferred embodiments thereof, taken in conjunction with the accompanying drawings.

BRIEF DESCRIPTION OF THE DRAWINGS

FIGS. 3a, 4a, 5a, 6a and 7a are diagrammatic side views for illustrating the operations of the car washer while

DETAILED DESCRIPTION OF PREFERRED EMBODIMENT

Figure 1:
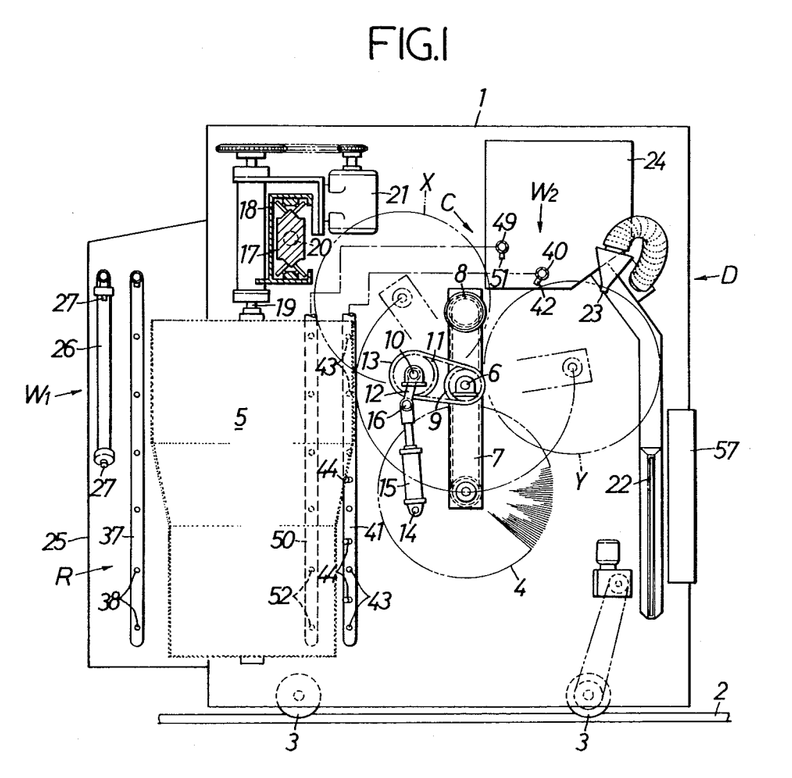
FIG. 1 is a vertical sectional side view of a car washer to which is applied one embodiment of the present invention.

The present invention will now be described by way of one embodiment with reference to the accompanying drawins. Referring to FIG. 1, there is shown a car washer in a schematic side view, to which the present invention is applied. As shown in FIG. 1, a portal or gate-like travel frame 1 is mounted on travel rails 2 laid on a ground for longitudinally travelling movement through travel wheels 3 pivoted thereon. The portal travel frame 1 has an upper rotary brush 4 and a pair of left and right side rotary brushes 5 supported thereon as rotary brush means according to the invention.

The upper rotary brush 4 is supported on a transverse shaft 6, laterally suspended on the portal travel frame 1, for swinging movement in the longitudinal directions through a swinging arm 7, and it can be driven for rotation by a motor 8 mounted on the swinging arm 7 through a transmitting mechanism within the swinging arm 7. The brush 4 can be brought into contact with an upper srrface of a vehicle body to brush and wash the upper surface. A sprocket 9 is secured on the transverse shaft 6, and another sprocket 11 and an operating arm 12 are secured on an intermediate shaft 10 which is freely rotatably supported on the portal travel frame 1 behind the transverse shaft 6 (on the left side of the shaft as viewed in FIG. 1). An endless chain 13 is passed around both of the sprockets 9 and 11. An air cylinder 15 is pivotally connected at its upper end through a pivot 16 to the operating arm 12 and has a lower end pivoted at 14 to the portal travel frame 1, so that when the air cylinder 15 in a position indicated by a solid line in FIG. 1 is operated to expand a predetermined amount, the swinging arm 7 can be swung about the transverse shaft 6 through a predetermined angle in a clockwise direction to hold the upper rotary brush 4 at an upper retracted or rest position X indicated by a dashed line in FIG. 1. When the air cylinder 15 is inoperative or free, the upper rotary brush 4 can be freely swung back and forth of the portal travel frame 1 about the transverse shaft 6 through the swinging arm 7. In FIG. 1, the reference character Y designates a limit of forward swinging movement of the upper rotary brush 4.

The pair of left and right side brushes 5 are suspended at the rear portion of the portal travel frame 1. More specifically, a pair of left and right movable frames 18, 18 are slidably mounted on and engaged with a guide rail 17 laid transversely on the upper portion of the portal travel frame 1, and vertical shafts 19, 19 having the pair of left and right side rotary brushes 5, 5 depending therefrom are mounted on the movable frames 18, 18, respectively. Each movable frame 18 and each vertical shaft 19 can be swung back and forth in the direction of travelling movement of the portal travel frame 1 about a support shaft 20 for the guide rail 17. A motor 21 is carried on each movable frame 18 and is operable to rotate the side rotary brush 5. The pair of left and right side rotary brushes 5 can be controlled for opening and closing movement along the guide rail 17 and brushing front, left- and right-side and rear surfaces of the body of a vehicle. Conventionally known mechanisms are used for supporting and actuating the upper and left and right side brushes 4 and 5 and hence, the detailed description thereof is omitted herein.

The portal travel frame 1 is equipped at its front portion with a dryer D, and specifically, a pair of left and right side blowing nozzles 22 are provided on the opposite lateral sides of the frame 1 and are opened inwardly into the frame 1, while an upper blowing nozzle 23 is liftably mounted on the upper surface of the frame 1 and similarly opened inwardly into the frame 1. These side and upper blowing nozzles 22 and 23 are connected to a blower 24 mounted on an upper portion of the portal travel frame 1 so as to extend between its opposite sides. This dryer D is also of a conventionally known construction and hence, the detailed description thereof is omitted herein.

Behind the side rotary brushes 5 on the portal travel frame 1, there is a primary treating agent applicator W1 for applying a primary treating agent containing an anionic surfactant therein in the foamy form onto a body surface of the vehicle. The arrangement of the primary treating agent applicator W1 will be described below principally with reference to FIG. 2. A portal or gate-type ejector pipe 26 for the primary treating agent is disposed across the portal travel frame 1 on a support frame 25 connected to the back surface of the portal travel frame 1 and has a plurality of nozzles 27 provided therein at distances with their ejecting ports facing inwardly into the frame 1. A foamy primary treating agent feed pipe 28 is connected to a midway of the ejecting pipe 26 and connected through a first ejector 29, a solenoid valve 30 and a reducing valve 31 to an air feed pipe 32 which is connected to an air tank A supported on the portal travel frame 1. A water pump P is connected through a second ejector 33, a solenoid valve 34 and a fresh water feed pipe 35 to the first ejector 29. In addition, a primary treating agent tank T1 is connected through a primary treating agent feed pipe 36 to the second ejector 33. Thus, if the solenoid valve 34 is opened after driving of the water pump P, pressurized water is passed through the solenoid valve 34 into the second ejector 33, and a primary treating agent within the primary treating agent tank T1 is drawn thereinto through the feed pipe 36 by an ejector effect, so that the primary treating agent and the pressurized water are mixed together therein and passed into the first ejector 29. Thereupon, if the solenoid valve 30 is further opened, high pressure air within the air tank A is passed through the reducing valve 31 and the solenoid valve 30 into the first ejector 29 where the mixture of the primary agent and water is mixed with the high pressure air to produce a foamy primary agent material which is supplied in the form of a foamy mass into the ejecting pipe 26 for ejection from the plurality of nozzles 27.

Figure 2:
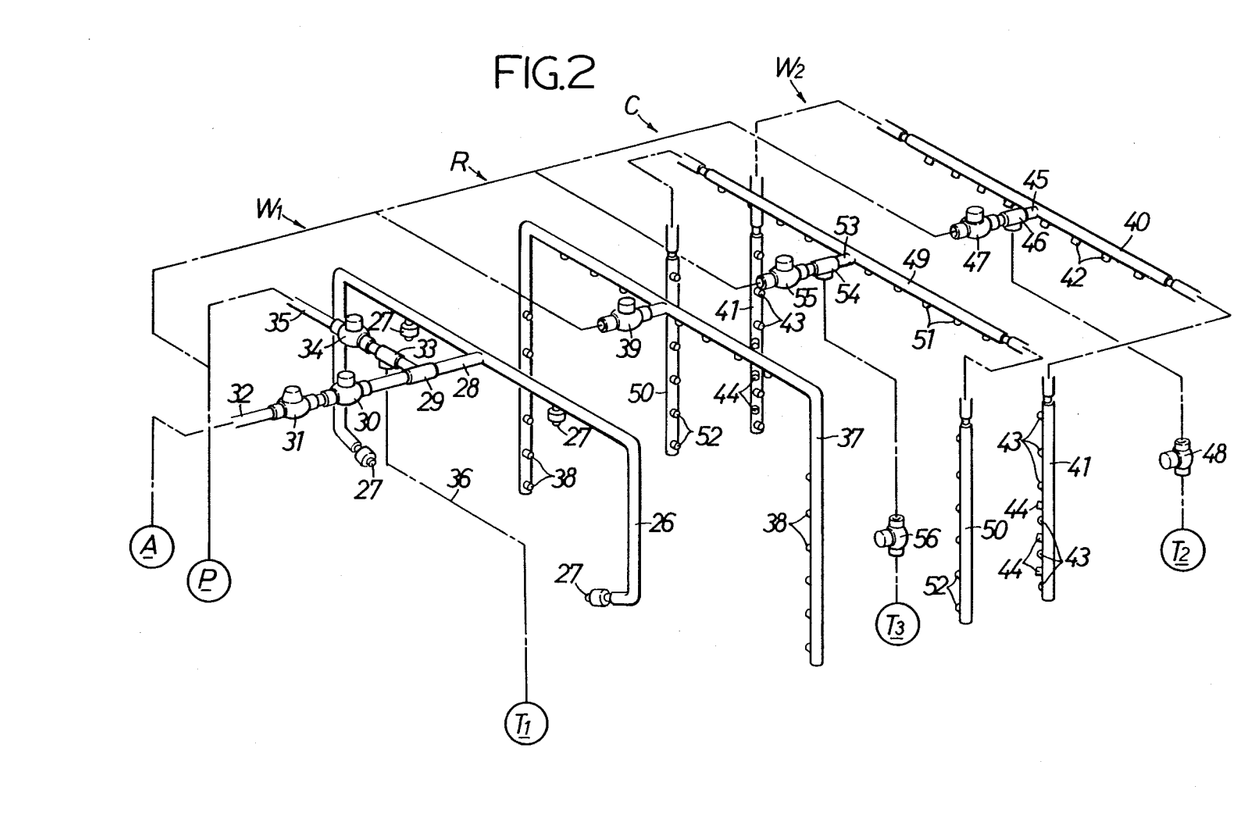
FIG. 2 is a perspective view of a piping system for a primary treating agent applicator, a rinsing unit, a cleaner applicator, and an aqueous wax applicator.
Figure 3A:
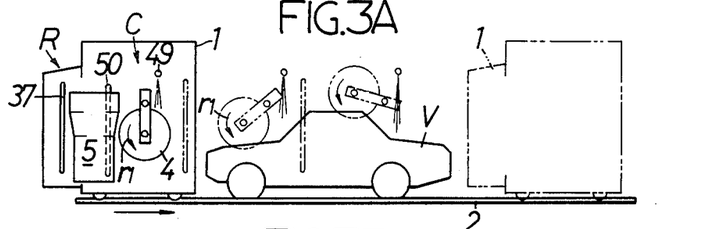
Figure 3B:
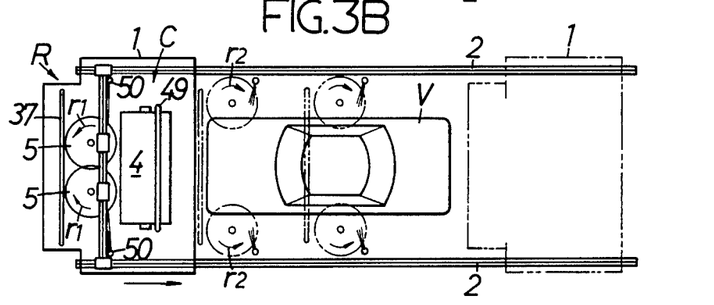
FIGS. 3b, 4b, 5b, 6b and 7b are similarly diagrammatic plan views for illustrating the operations.

A rinsing unit R is mounted on the support frame 25 adjacent and in front of the primary agent applicator W1. The rinsing unit R comprises a substantially portal or gate-type fresh water ejecting pipe 37 disposed substantially in parallel to the primary treating agent ejecting pipe 26, and a plurality of nozzles 38 provided in the ejecting pipe 37 and having ejecting ports faced inwardly into the portal travel frame 1. The water pump P is connected to a midway of the fresh water ejecting pipe 37 through a solenoid valve 39, so that opening of the solenoid valve 39 enables the fresh water to be ejected from the nozzles 38.

Provided on the portal or gate-like travel frame 1 are an aqueous wax applicator W2 for applying an aqueous wax containing a cationic surfactant onto the vehicle body surface and a cleaner applicator C for applying a cleaner onto the vehicle body surface. The aqueous wax applicator W2 includes an upper aqueous wax ejecting pipe 40 disposed on the upper portion of and across the travel frame 1 at a position between the upper rotary brush 4 and the dryer D, and a pair of left- and right-side aqueous wax ejecting pipes 41, 41 laid on the inner left and right side surfaces of the travel frame 1 at a position between the upper rotary brush 4 and the pair of side brushes 5. The side aqueous wax ejecting pipes 41 are connected to the opposite ends of the upper aqueous wax ejecting pipe 40, respectively. The upper aqueous wax ejecting pipe 40 has a plurality of ejecting nozzles 42 provided therein with their ejecting ports directed or faced rearwardly and downwardly for direct ejecting application to the upper aqueous brush 4 when the latter is located in the vicinity of its operative position shown by the solid line in FIG. 1. The side aqueous wax ejecting pipe 41 also includes a plurality of nozzles 43 each having an ejecting port directed inwardly, horizontally and just laterally with respect to the travel frame 1 and a plurality of nozzles 44 each having an ejecting port directed horizontally, rearwardly and inwardly toward the side rotary brushes 5. The nozzles 42-44 constitute nozzle means according to the invention. The upper aqueous wax ejecting pipe 40 is connected on its midway to the water pump P through an aqueous wax feed pipe 45, a third ejector 46 and a solenoid valve 47. An aqueous wax tank T2 is connected through a solenoid valve 48 to the third ejector 46. Thus, if both of the solenoid valves 47 and 48 are opened after driving of the water pump P, the pressurized water is passed to the ejector 46 where this water is mixed with an aqueous wax drawn thereinto out of the aqueous tank T2 under an ejector effect, and the resulting mixture is ejected through the plurality of nozzles 42, 43 and 44. Alternatively, if the solenoid valve 47 is opened with the solenoid valve 48 closed, a fresh water can be ejected through the nozzles 42, 43 and 44.

The cleaner applicator C comprises an upper cleaner ejecting pipe 49 mounted on the portal travel frame 1 adjacent the rear portion of the upper aqueous wax ejecting pipe 40, and side aqueous ejecting pipes 50, 50 mounted on the frame 1 adjacent the rear portions of the side aqueous wax ejecting pipes 41. The side ejecting pipes 50 are connected to the opposite ends of the upper ejecting pipe 49, respectively. The upper ejecting pipe 49 is provided with a plurality nozzles 51 each having an ejecting port directed just downwardly so that a cleaner can be directly ejected to the upper rotary brush 4 when the latter is located in the vicinity of the operative position indicated by the solid line in FIG. 1. The side ejecting pipe 50 also includes a plurality of nozzles 52 provided therein with their ejecting ports directed inwardly to the side rotary brushes 5. The water pump P is connected to a midway of the upper cleaner ejecting pipe 49 through a cleaner feed pipe 53, a fourth ejector 54 and a solenoid valve 55. A cleaner tank T3 is connected through a solenoid valve 56 to the fourth ejector 54. Thus, if both of the solenoid valves 55 and 56 are opened after driving of the water pump P, the pressurized water is passed into the fourth ejector 54 where this water is mixed with a cleaner drawn thereinto out of the cleaner tank T3 under an ejector effect, and the resulting mixture is ejected through the plurality of nozzles 51 and 52. Alternatively, if the solenoid valve 55 is opened while the solenoid valve 56 is closed, the fresh water can be ejected through the nozzles 51 and 52.

The operations of the system for actuating the individual rotary brushes 4 and 5, the cleaner applicator C, the primary treating agent applicator W1, and the aqueous wax applicator W2, the rinsing unit R and the dryer D, as well as the operation of travelling of the travel frame 1 are controlled by a control system 57 mounted on the travel frame 1.

The operation of this embodiment will be described below with reference to FIGS. 3a and 3b through 7a and 7b.

Brushing and washing step

First, the vehicle V is stopped at a predetermined location between the travel rails 2. In the left end position of the portal travel frame 1 as viewed in FIGS. 3a and 3b, the upper rotary brush 4 is lowered from the retracted position X shown by the dashed line in FIG. 1 to the operative position shown by the solid line in FIG. 1 in the above-described manner while leaving the upper blowing nozzle 23 maintained at its raised location. Thereafter, when the upper rotary brush 4 and the pair of left and right side rotary brushes 5 are rotated in a normal direction (indicated by an arrow r1 in FIGS. 3a and 3b) and when the portal travel frame is advanced in the right direction as viewed in FIG. 3 while ejecting the cleaner from the upper and side ejecting pipes 49 and 50 and also the fresh water from the fresh water ejecting pipe 37, the upper rotary brush 4 is swung about the transverse shaft 6 to brush and wash the upper surface of the body of the vehicle V, while the pair of left and right side brushes 5 are controlled in opening and closing along the guide rail 17 to sequentially brush and wash the front surface, the left and right opposite sides and the rear surface of the vehicle body. The dirt and cleaner remaining on the body surface as a result of such brushing and washing are washed away by the fresh water ejected through the fresh water ejecting pipe 37. Such brushing and washing is conventionally well known, and in this embodiment, it should be particularly noted that the pair of left and right side rotary brushes 5 can be reversed (in the direction indicated by an arrow r2 in FIG. 3b) after brushing of the front surface of the vehicle body, namely in brushing the left and right opposite sides and the rear surface of the vehicle body.

In this way, when the travel frame 1 has reached a right end position as indicated by a dashed line in FIG. 3, the travelling thereof is stopped, while at the same time stopping the ejection of the cleaner and the fresh water, thus completing the brushing and washing step for the vehicle body.

First polishing step

Figure 4A:
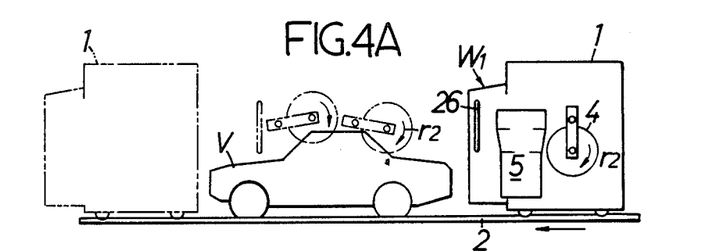
Figure 4B:
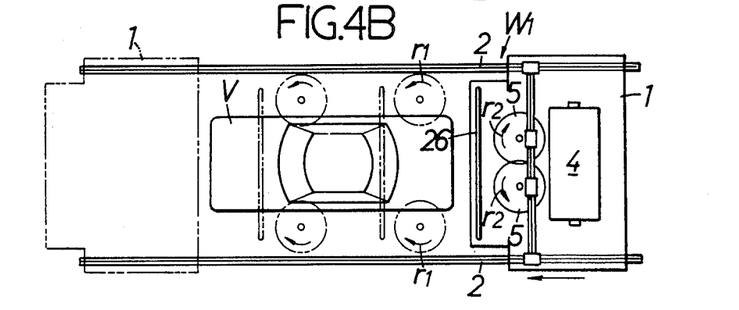

With the portal travel frame 1 in the right end position as shown by the solid line in FIGS. 4a and 4b, the upper and side rotary brushes 4 and 5 are now reversed (in the direction indicated by the arrow r2 in FIGS. 4a and 4b) and the portal travel frame 1 is retreated in the left direction as viewed in FIG. 4 while ejecting the foamy primary treating agent from the primary treating agent ejecting pipe 26 of the primary agent applicator W1. In doing so, the foamy primary treating agent is applied onto the vehicle body surface which can be then polished by the individual rotary brushes 4 and 5 in the procedure opposite to the above-described brushing and washing, i.e., the foamy primary treating agent can be rubbed onto the vehicle body surface. It is noted that in such polishing step, the pair of side rotary brushes 5 are again normally rotated (in the direction indicated by the arrow r1 in FIG. 4b) after polishing of the rear surface of the vehicle body, namely in polishing the opposite-side surfaces and the front surface of the vehicle body.

The primary treating agent ejected in this step is in the foamy form and hence, cannot be immediately dropped after applied onto the surface of the vehicle body, and even a relative small amount of the primary treating agent can be uniformly applied onto the body surface.

Thus, when the portal travel frame 1 has reached the left end position as shown by the dashed line in FIGS. 4a and 4b, the travelling thereof is stopped while at the same time cutting-off the ejection of the foamy primary treating agent, thereby completing the first polishing step for the vehicle body.

Step for applying the aqueous wax to the rotary brushes

Figure 5A:
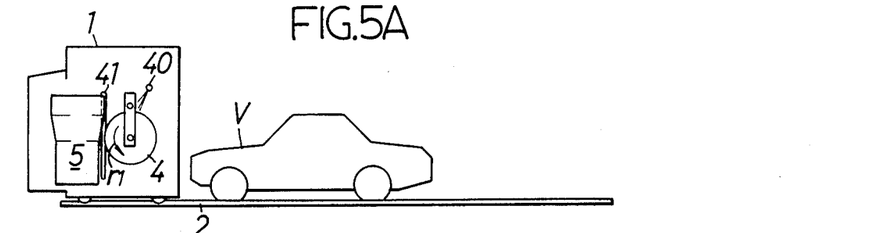
Figure 5B:
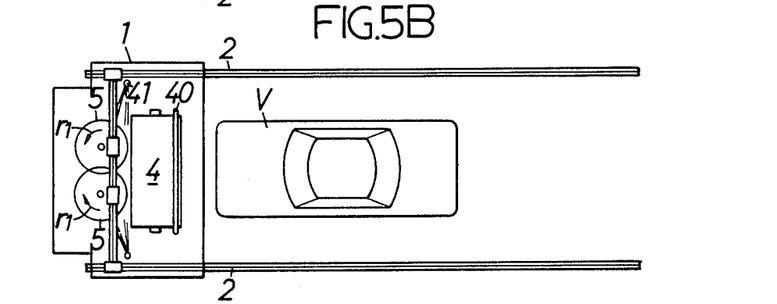

Then, with the portal travel frame 1 left stationary at the left end position as shown in FIGS. 5a and 5b, the upper and side rotary brushes 4 and 5 are normally rotated (in the direction indicated by the arrow r1 in FIGS. 5a and 5b) and the aqueous wax is ejected through the upper and side aqueous wax ejecting pipes 40 and 41 of the aqueous wax applicator W2 for direct application to the upper and side rotary brushes 4 and 5. Such application is continued for a period of time sufficiently to allow the cationic surfactant in the aqueous wax applied to react with the anionic surfactant in the primary treating agent deposited on the individual rotary brushes 4 and 5 at the first polishing step and satisfactorily produce an insoluble wax component, for example, for about 5 seconds.

Second polishing and rinsing step

Upon completion of the aqueous wax application step, the fresh water is ejected through the fresh water ejecting pipe 37 of the rinsing unit R while subsequently maintaining the aqueous wax applicator W2 in an operative state, and the travel frame 1 is advanced in the right direction as viewed in FIGS. 6a and 6b. This advancing movement causes the body surface to be applied with the aqueous wax and again polished by the upper and side rotary brushes 4 and 5 in the same order as in the afore-mentioned brushing and washing step, while causing the excessive wax on the body surface to be washed away by the fresh water ejected from the rinsing unit R. It is noted that in such second polishing step, the pair of side rotary brushes 5 are reversed (in the direction indicated by the arrow r2 in FIG. 6b) after polishing of the front surface of the vehicle body, i.e., in polishing the opposite side surfaces and the rear surface of the vehicle body.

In the above second polishing step, the insoluble wax component satisfactorily produced and retained in the rotary brushes 4 and 5 at the previous step, i.e., at the step for applying the aqueous wax to the rotary brushes and the insoluble wax component produced from the contact reaction of the aqueous wax applied at the second polishing step with the primary treating agent deposited on the vehicle body surface at the first polishing step can be rubbed onto the individual surfaces of the vehicle body under the polishing action of the rotary brushes 4 and 5 to form a thick wax film thereon.

Figure 6A:
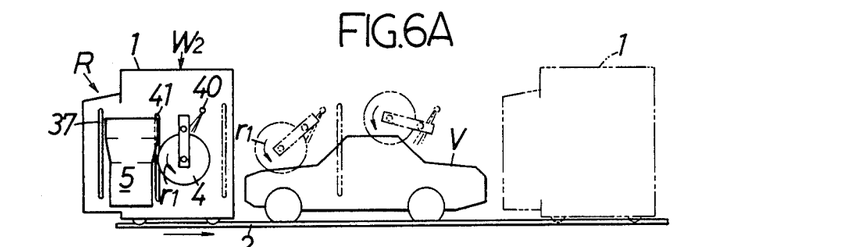
Figure 6B:
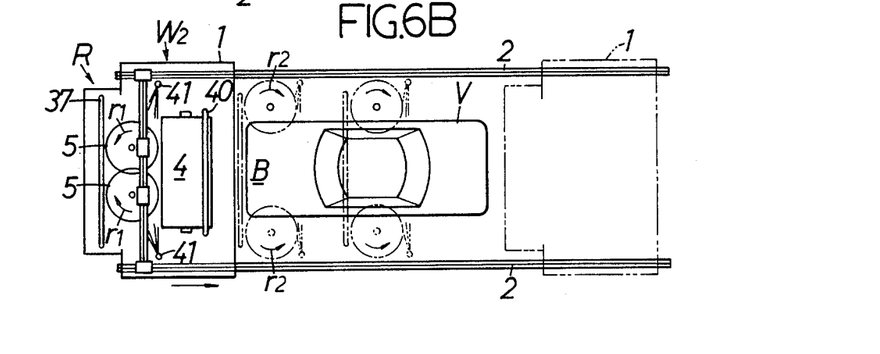

Thus, when the portal travel frame 1 has reached the right end position as shown by the dashed line in FIGS. 6a and 6b, the travelling thereof is stopped while at the same time stopping the rotation of the individual rotary brushes 4 and 5 and the ejection of the aqueous wax and the fresh water. Then, the rotary brush 4 is raised to the upper retracted position X in the above-described manner and further, the pair of side rotary brushes 5 are opened outwardly, thus completing the second polishing and rinsing step.

Drying step

Figure 7A:
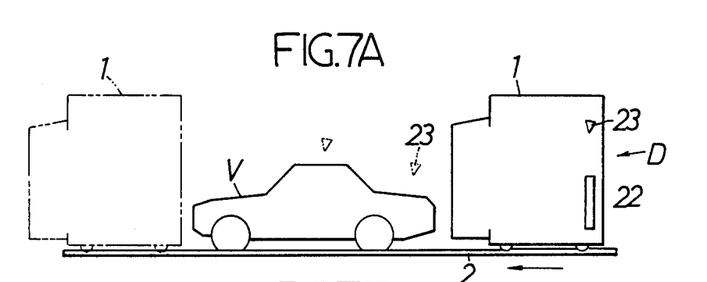
Figure 7B:
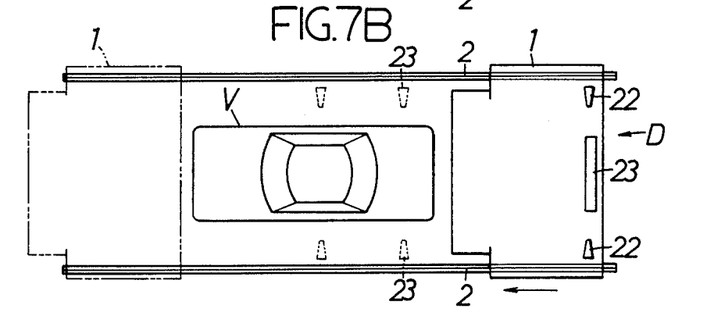

Finally, the portal travel frame 1 which is in the right end position in FIGS. 7a and 7b is retreated again, and the upper blowing nozzle 23 is lowered to an appropriate position. Then, the blower 24 is driven to eject drying air simultaneously from the pair of side nozzles 22 and the upper blowing nozzle 23, which air is blown onto the entire rinsed surface of the vehicle body. This enables droplets of water on the vehicle body surface to be blown off. If the portal travel frame 1 has reached the left end position, the travelling thereof is stopped and the driving of the blower 24 is stopped to complete the drying step for the vehicle body.

In the above manner, all the steps of washing, polishing with the foamy primary agent, polishing and rinsing with the aqueous wax and drying of the vehicle body are completed.

It is to be understood that in the first polishing step, the foamy primary treating agent containing the anionic surfactant forms a primary treating agent film on the body surface under the polishing action of the rotary brushes 4 and 5, so that such film enables the cationic surfactant containing aqueous wax applied onto the vehicle body surface to be easily deposited onto the vehicle body surface at the second polishing step. In addition, this deposition of the aqueous wax results in a reaction of the cationic surfactant in that wax with the anionic surfactant in the primary treating agent to convert the wax component dissolved in the aqueous wax into an insoluble component which can be rubbed onto vehicle body surface under the polishing action of the individual rotary brushes 4 and 5. Though there is a slight time lag from the point of contact of both the surfactants to the point of production of such insoluble wax component, however, according to the present invention, the aqueous wax is directly applied to the individual rotary brushes 4 and 5 prior to the second polishing step and therefore, it is possible for the thus-applied aqueous wax to react with the primary treating agent deposited on the indiidual brushes 4 and 5 at the preceding step i.e., at the polishing step to satisfactorily produce and retain the insoluble wax component in the individual rotary brushes 4 and 5, permitting the second polishing step to be proceeded with the insoluble component kept in such retained state. Therefore, from the beginning of the second polishing step, the insoluble wax component can be satisfactorily rubbed even onto the vehicle body surface (for example, the front surface of a bonnet as indicated by a character B in FIG. 6b) which is polished by the rotary brushes 4 and 5 at the beginning of the second polishing step, thereby giving a thick wax film, without any hindrance even if the polishing time is shortened due to an increase in travelling speed of the travel frame 1.

Although the aqueous wax has been directly applied to all of the upper rotary brush 4 and the opposite-side rotary brushes 5 prior to the second polishing step in the above embodiment, it should be understood that according to the present invention, the aqueous wax may be directly applied to one of the rotary brushes 4 and 5 only in such a manner that the applied aqueous wax may be scattered by the one rotary brush to the other rotary brush, thus causing reaction of the wax also with the primary treating agent deposited in the other rotary brush, then proceeding to the second polishing step.

What is claimed is:

1. A vehicle polishing method comprising at least: a first polishing step of moving a portal travel frame travellable forwardly and backwardly in one of opposite travelling directions over a vehicle held in a stationary state to polish a body surface of said vehicle by rotary brush means mounted on said travel frame during such movement while applying a primary treating agent containing an anionic surfactant in a foamy form onto the body surface of said vehicle by a primary treating agent applicator mounted on said travel frame; and a second polishing and rinsing step of moving said travel frame in the other travelling direction and polishing said body surface by said rotary brush means while applying an aqueous wax containing a cationic surfactant onto said body surface by an aqueous wax applicator, and further ejecting fresh water onto said body surface by a rinsing unit mounted on said travel frame to wash away excessive wax from said body surface, wherein after termination of said first polishing step and before starting of said second polishing and rinsing step, said cationic surfactant-containing aqueous wax is applied to said rotary brush means for a predetermined period of time.

2. A vehicle polishing apparatus on a portal travel frame reciprocally travellable on travel rails over a vehicle, said apparatus comprising rotary brush means which is commonly usable for both brushing and washing operation and polishing operation of a body surface of said vehicle, a cleaner applicator for applying a cleaner onto said body surface, a primary treating agent applicator for applying a foamy primary treating agent containing an anionic surfactant onto said body surface, an aqueous wax applicator for applying an aqueous wax containing a cationic surfactant onto said body surface, a rinsing unit for ejecting fresh water onto said body surface, and a dryer for drying said body surface, wherein said aqueous wax applicator includes nozzle means adapted to directly eject said aqueous wax toward said rotary brush means.

* * * * *

UNITED STATES PATENT AND TRADEMARK OFFICE
CERTIFICATE OF CORRECTION

PATENT NO. : 4,781,946

DATED : November 1, 1988

INVENTOR(S) : Shigeo TAKEUCHI

It is certified that error appears in the above-identified patent and that said Letters Patent is hereby corrected as shown below:

On the cover page, Item [30], "62-104477" should read --62-102477--.

Signed and Sealed this

Twenty-fifth Day of April, 1989

Attest:

DONALD J. QUIGG

Attesting Officer

Commissioner of Patents and Trademarks